Sept. 15, 1936. A. D. EITZEN Re. 20,110

LAMP CONTROL MECHANISM FOR MESSAGE TRANSMITTING SYSTEMS

Original Filed March 10, 1930 2 Sheets-Sheet 1

INVENTOR
August D. Eitzen,
BY Gustav Drew
ATTORNEY

LAMP CONTROL MECHANISM FOR MESSAGE TRANSMITTING SYSTEMS

Original Filed March 10, 1930 2 Sheets-Sheet 2

INVENTOR
August D. Eitzen,
BY
Gustav Grau
ATTORNEY

Reissued Sept. 15, 1936

Re. 20,110

UNITED STATES PATENT OFFICE 20,110

LAMP CONTROL MECHANISM FOR MESSAGE TRANSMITTING SYSTEMS

August D. Eitzen, Rockville Centre, N. Y., assignor to News Projection Corporation, New York, N. Y., a corporation of New York Original No. 1,908,333, dated May 9, 1933, Serial No. 434,539, March 10, 1930. Application for reissue October 23, 1934, Serial No. 749,650

24 Claims. (Cl. 88—24)

My invention relates to means for controlling the lamp circuits of projecting apparatus operated in conjunction with message transmitting or receiving instruments of the tape printing type.

The principal object is to control the lamp circuits of any or all of the projectors in the system from devices associated in the circuit of a tape printing machine, such for instance as the controlling switch mechanism of the corresponding tape printing machine; and specifically to control the lamp circuit by means of a relay which is operated by the switch and relay mechanism of the printing machine and in turn actuates a mercury switch in the house current line and in circuit with the projector lamp, so that when the controlling switch of the message-sending station in the system is moved to operative position the lamps of all the projectors in the system are lit by means associated with the individual tape printing and projecting units.

The motor of the tape printer draws only a small current while the projector lamp is of high wattage, and draws more current than can be handled through the switch and relay of the tape printer. By arranging each projector lamp in an independent circuit, controlled by an individual switch and relay from the controlling relay of the corresponding tape printer, and especially when a mercury switch is used in the lamp circuit, the necessary high amperage is successfully handled and all the lamps in the system may be lit or extinguished coincidentally with the closing and opening of the motor circuits of all the printing machines in the system, without any complication or effect upon the action of the printing machine or its switch or relay mechanism and without necessity for running any line circuits through the building to interconnect the projector lamps of the different units.

One example of the utility of the invention is in the installation of such a message transmitting system in a hospital where it is desired to simultaneously visually present a message such as a call for a physician, on all of a plurality of screens located in different rooms etc., and the lighting of all of the projector lamps simultaneously with placing the printing machines in condition for operation, causes the screens to be illuminated and directs attention to the message to be thrown upon the screen; and similarly when the transmission or projection of the message is discontinued the lamps are simultaneously extinguished and the screens are darkened.

The invention also includes provision for operating the printing machines or any of them without lighting the corresponding projector lamp. This is valuable in some cases, as in an intercommunicating system when it may be desired to transmit a message for reading directly from the tapes of the various printers and without throwing the legend upon the screen for general observation, as for example, in uses analogous to stock quotation transmitting systems, where it may be desired to transmit a message for the observation of brokers without throwing the message on the screen for observation by customers.

These and other features, capabilities and advantages of the invention will appear from the subjoined detail description of one embodiment thereof, illustrated in the accompanying drawings, in which Fig. 1 is a diagrammatic view of a system and mechanism embodying the invention in one form;

Figure 1:
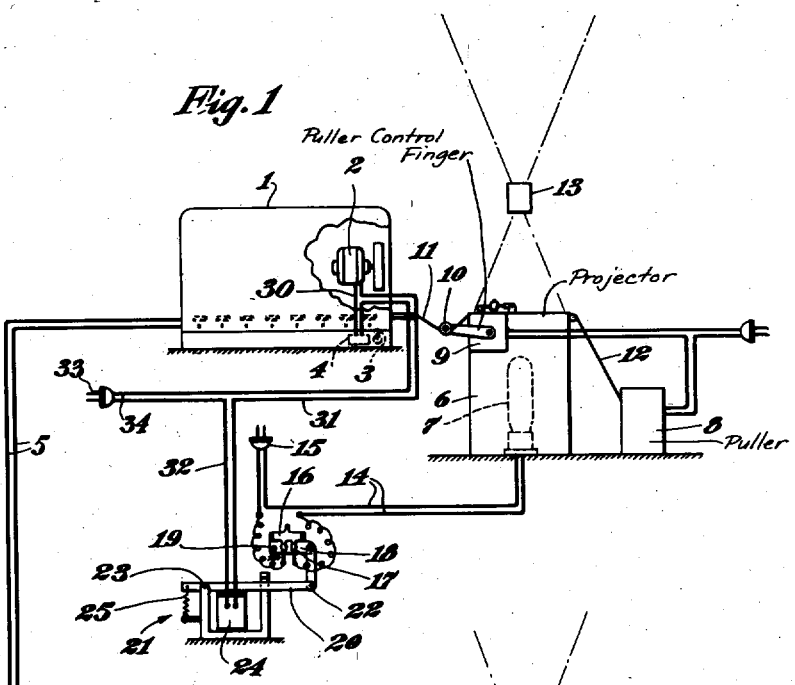

In Fig. 1, 1—1 are any known or suitable tape printers or telegraphic printers, as viewed from the rear, representing any desired number in a system, any or all of which may be combined transmitters and receivers or any number of which may be arranged for operation as receivers only. Each of these machines includes a motor 2, and a controlling switch 3 for closing and opening the message transmitting circuit including a relay magnet for a relay mechanism 4, represented by the conductors 5, connecting all the printers, and simultaneously starting and stopping all of the motors. The switches are so arranged that the switch at that station which for the time being is the message transmitting station will act to put all of the printers in operative or inoperative condition.

Associated with each printer is projecting apparatus comprising a projector proper 6, enclosing the lamp 7, a tape puller 8 for drawing the tape from the printer and across the light aperture of the projector, and a switch 9 controlled by a follower 10 running on a loop 11 of the tape 12 to control operation of the tape puller in accordance with the action of the printer, all as well understood by skilled persons, and as set forth in my previous applications, since issued as Patents Nos. 1,974,153 and 1,981,858. The projector of course includes suitable lenses, the objective lenses 13 only being represented and each objective is arranged to throw the light beam, with or without interposed mirrors, on a surface, such as a conveniently located screen (not shown).

For proper illumination, the lamps 7 are of high amperage, and for their proper control as and for the purposes above referred to, each lamp is connected as by conductors 14 and a plug 15 to the house circuit, and a suitable switch, preferably a mercury switch 16, is interposed in one of the conductors. This switch as illustrated is of a known type, consisting of a sealed glass shell or cartridge enclosing a body of mercury and also having pockets 17 containing separated contacts or wire terminals, outer portions of which are connected into one of the conductors 14, as shown. The switch cartridge is carried by a support 18 mounted to oscillate on the center 19, and is operated by the armature 20 of a relay 21, the armature being connected to the switch support as by a link 22. The armature is fulcrumed at 23 and is operated by a relay magnet 24 which acts in opposition to a spring 25 which normally moves the armature away from the magnet and tilts the switch to circuit breaking position.

The controlling relay 4 having a relay magnet in the message transmitting circuit 5, 5 of the tape printer 1 has one of its contacts or terminals connected to one of the motor terminals by a conductor 30, and from the other motor terminal a conductor 31 runs to one terminal of relay magnet 24. From the other terminal of this magnet a conductor 32 runs to one of the prongs of a plug 33 and from the other plug prong a conductor 34 runs to the other contact or terminal of the printer-controlling relay 4.

By the described arrangement each tape printer with its associated projector may be connected into the house circuit by merely inserting the two plugs in conveniently located plug sockets, and there is no necessity for inter-wiring of the different units and especially no necessity for interwiring for their lamp circuits. The circuit for the lamp is also kept separate from the power circuit for the tape printer so that the heavy current draw of the lamp has no effect upon the printing machine or its switch or relay mechanism. In the particular embodiment of the invention illustrated, whenever the controlling switch of the particular station which is used as the message-transmitting station is closed, the result will be the electric transmission of a message whose operation and effect is that each of the printers representing the receiving stations is placed in operative position, all of the printer motors are started and the transmission line between the printers is energized, and simultaneously the current flow to each of the printer motors energizes the magnet of the corresponding relay 21, thus causing the corresponding mercury switch to move to circuit closing position and lighting the lamp, so that all of the projectors in the system illuminate their respective screens to call attention to the message about to be transmitted. When any controlling switch is moved to off position the printers are deenergized and simultaneously the relay magnets 24 are deenergized and all of the lamps are extinguished.

It will be seen from the above, that the relays 21 are so associated with the transmission line that they are responsive to only certain changes in condition produced in the transmission line for controlling the operation of such relays, namely, energization and de-energization of the transmission line by operating the controlling switch, and are not responsive to the changes in condition produced in the transmission line by transmitting a message over the line while the printers are in active condition. Therefore, when the condition of the transmission line is changed by moving the controlling switch to energize the same, the magnets of the relays 21 are energized, thus causing their associated mercury switches to move to circuit closing position and start the operation of the projector, and the relays 21 will maintain the projector in operative condition even though the condition of the transmission line is being constantly changed by the message impulses sent over it to the printing machine until the condition of the transmission line is changed from an energized state to a de-energized state by operating the controlling switch.

Figure 2:
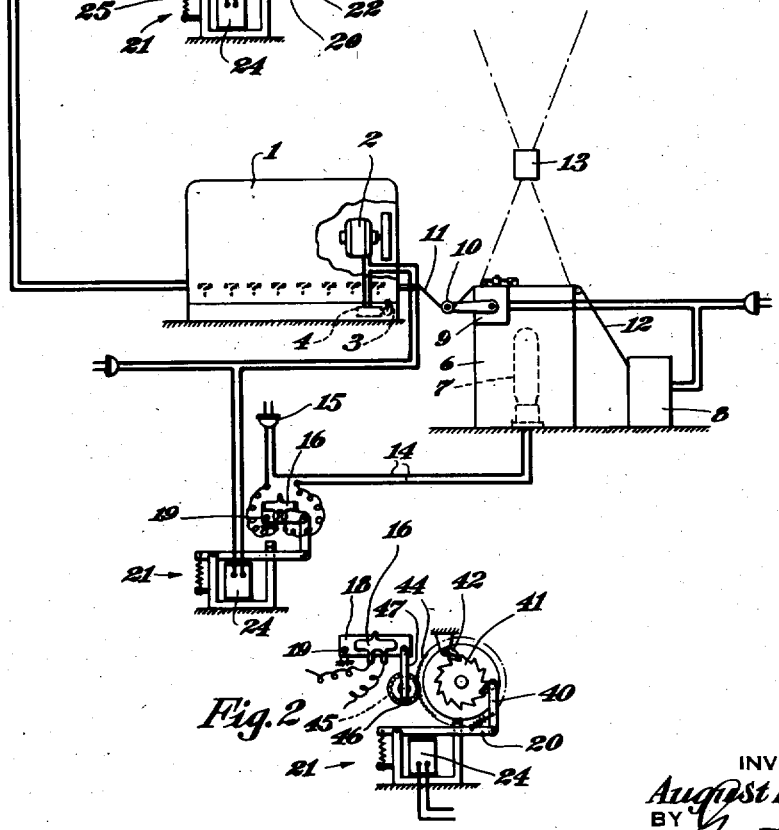
Fig. 2 is a detail view of a modified switch operating mechanism.

It will thus be observed that the messages of whatever station happens to be used as the message-transmitting station are of two types, one which transmits to all the receiving stations the message that the lamps are to be lit whereupon this message is automatically carried out as the result of the impulse which created this message, and, second, one which controls the printer so that it will execute the reproduction in printed form what this type of message transmits. In the system illustrated in Fig. 1 these two types of messages follow each other and are interdependent to the extent that the message which calls for actuation of the printer cannot be sent until after the message has first, by the closing of the control switch, been sent to all the receiving stations to light the lamps. In Fig. 2, a selectivity is provided for by virtue of which a message which calls for the printer to operate may be sent independently of the message which calls for lighting the lamp. In the several systems, however, where the ticker is included in an electric circuit or where such a circuit includes a motor for the ticker, it is apparent that in every such case, whether the arrangement illustrated in Figure 1 or in Figure 2 is made use of, that ticker circuit is responsive to establish an electric circuit in the wiring which includes the ticker whenever a message of either type is transmitted to the ticker. In other words, the message which causes the lamp switch to be actuated may be transmitted by closing the message-transmitting circuit, thereby closing the ticker circuit and thereby in turn causing operation of the lamp switch to the on position (as in Fig. 1), or, after closing the message-transmitting circuit, sending a special impulse through the message-transmitting circuit which will cause the lamp switch to be actuated to the on (or off) position of the lamp switch by way of special message through the ticker circuit which operates the lamp switch without involving the message-printing function of the ticker (as in Fig. 2).

Fig. 2 shows a lamp-switch control mechanism arranged to permit message transmission selectively with or without lighting the projector lamps, in order, for example, to avoid throwing a transmitted message upon the screens, as referred to early above. In this arrangement the relay 21 may be associated as before, but its armature 20 has connected to it a spring-operated pawl 40 acting on a circular ratchet 41, which may have a detent pawl 42. The ratchet wheel is connected to a gear 44 engaging a pinion 45 and this pinion is connected by a crank pin 46 and link or pitman 47 to the switch support 18. The gear 44 and pinion 45 have diameters related to the number of teeth on the ratchet wheel 41. Thus, if there are twelve teeth on the wheel, as shown, the multiplying ratio as between gear 44 and the pinion will be six to one, in order to rotate the crank pin 46 one-half revolution about the pinion axis each time the pawl 40 moves the ratchet wheel one tooth space. This type of switch mechanism may be included in any or all of the projecting units.

When the operator at a control station closes the switch of the printing machine, to put the entire system in operating condition, if the parts of the lamp circuit control mechanism are in the position of Fig. 2, the energizing of magnet 24 will pull down the armature and pawl 40 will rotate the ratchet wheel one tooth space, thus rotating pinion 45 one-half revolution, whereby link 47 will tilt the switch support to circuit breaking position, so that the printing system has been placed in operation while the lamp circuits are broken. To close all the lamp circuits for projection simultaneously with message transmission, it is only necessary to move the controlling switch to off position to de-energize the relay magnet 24 and then again immediately to operative position, whereupon the relay magnet 24 will again be energized and pinion 45 rotated another half-turn, or back to the position of Fig. 2, thus closing the lamp circuit. As a result of this arrangement the lamp circuit is closed only when the switch mechanism connecting such circuit with the relay magnet 24 is actuated by repetitious actions of the relay magnet 24 and in order to produce such repetitious actions of the relay magnet 24 it is necessary to change repeatedly the condition of the transmission circuit from a de-energized state to an energized state by the repetitious actions of the controlling switch. By again moving the controlling switch to off position and then again immedately to operative position the condition is again attained where the messages recorded by the printing machine are not projected upon the screen. In this way the operator has selective control of the projectors in respect to their illumination, by the simple means of operating the printer controlling switch either one or two times.

Figure 3:
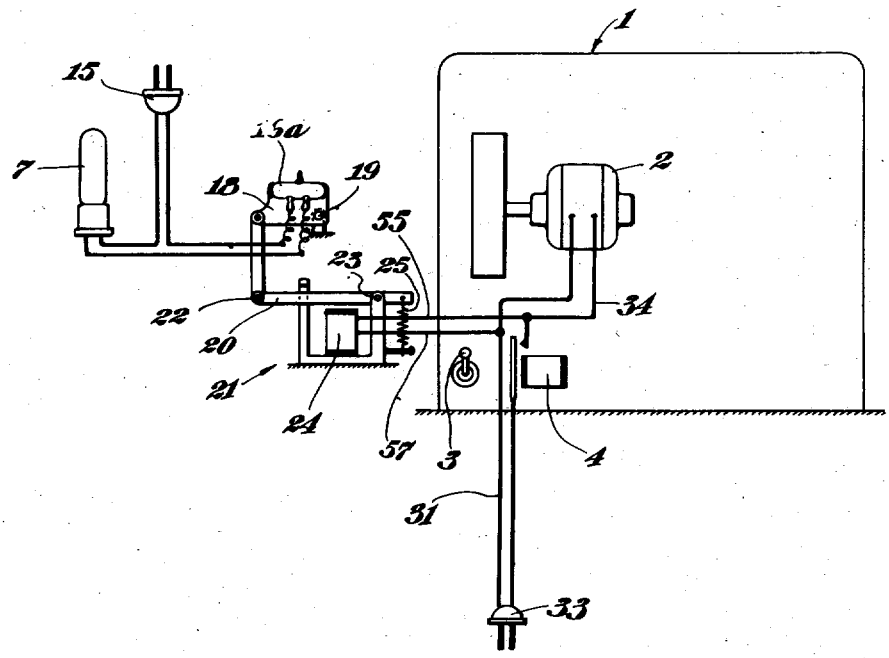
Fig. 3 is a diagram of a somewhat modified controlling circuit for the lamp switch relay.

Fig. 3 shows that the circuit for the relay magnet 24 may be different, or differently arranged in relation to the circuit of the motor 2 of the tape printer or printing telegraph 1. Thus, in Fig. 3 the relay magnet 24 is in parallel or shunt relation to the motor circuit, one lead 55 running from one side of the motor circuit to one terminal of the relay magnet and another conductor 57 running from the other side of the motor circuit to the other terminal of the relay magnet. The lamp circuit including the mercury switch **16*a*** is easily traced without explanation. The operation is the same as explained in connection with Fig. 1.

It is obvious that various changes and modifications may be made in the details of construction without departing from the general spirit of the invention set forth in the appended claims.

I claim:

1. In combination with a projector including a lamp, a message transmitting circuit including the relay magnet of a controlling relay and a tape printer including a motor and a motor circuit operatively associated with said relay magnet, a lamp circuit including said lamp and a switch, and a second relay including a relay magnet for operating the switch associated with said lamp circuit, said first relay magnet being energized when a message is transmitted to said printer in turn to close the motor circuit to operate the motor, and the relay magnet of said second relay being thereupon energized when current flows through said motor circuit in turn to close said lamp switch.

2. In apparatus or a system of the class described, in combination with a message transmitting circuit including the relay magnet of a controlling relay, a tape printer including a motor and a motor circuit, operatively associated with said relay magnet, and a projector including a lamp, an independent lamp circuit including a mercury switch, and a second relay connected to operate the switch, the relay magnet for said latter relay being included in said motor circuit, whereby the lamp circuit is closed when the printer is put in operative condition, and broken when the printer is inoperative, the relay magnet of the controlling relay beng energized when a message is transmitted to said printer in turn to close the motor circuit to operate the motor, and the relay magnet of said second relay being thereupon energized when current flows through said motor circuit in turn to close said mercury switch.

3. In combination with a projector including a lamp and a tape printer including a motor, a motor circuit and a controlling relay in said circuit, a lamp circuit including said lamp and a switch, a relay for operating the switch and included in said motor circuit, and means intermediate the lamp circuit controlling relay and the lamp switch and acting selectively by repetitious actions of the tape printer controlling relay to illuminate or extinguish the lamp while the printer is in active condition.

4. In combination with a projector including a lamp and a tape printer including a motor, a motor circuit and a controlling relay in said circuit, a lamp circuit including said lamp and a switch, a relay for operating the switch and included in said motor circuit, and means intermediate the lamp circuit relay and the switch for moving the switch to closed circuit position by one actuation of the relay and to open circuit position on the next actuation of the relay.

5. A communication system of the character described comprising a message transmitting circuit including the relay magnet of a controlling relay, and a plurality of units, each unit comprising a printer including a motor and a motor circuit operatively associated with said controlling relay, and a projector including a lamp, an independent lamp circuit including a mercury switch, and a second relay connected to operate the switch, the relay magnet for said second relay being included in said motor circuit, whereby the lamp circuit is closed when the printer is put in operative condition, and broken when the printer is inoperative, said controlling relay being actuated when a message is transmitted to said printer in turn to close the motor circuit to operate the motor, and the relay magnet of said second relay being energized when current flows through said motor circuit to close said switch.

6. A communication system of the character described comprising a plurality of units, each unit comprising a printer including a motor, a motor circuit and a controlling relay in said circuit, a projector including a lamp, a lamp circuit including said lamp and a switch, a relay for operating the switch and included in said motor circuit, and means intermediate the lamp circuit controlling relay and the lamp switch and acting selectively by repetitious action of the tape printer controlling relay to illuminate or extinguish the lamp while the printer is in active condition.

7. A communication system of the character described comprising a message transmitting circuit operatively associated to operate a controlling relay, and a plurality of units, each unit comprising a printer including a motor and a motor circuit operatively associated with said controlling relay, and a projector including a lamp, an independent lamp circuit including a mercury switch, a second relay connected to operate the switch, the relay magnet for said second relay being included in said motor circuit, whereby the lamp circuit is closed when the printer is put in operative condition, and broken when the printer is inoperative, and means intermediate the lamp circuit relay and the switch for moving the switch to closed circuit position by one actuation of the relay and to open circuit position on the next actuation of the relay, said controlling relay being actuated when a message is transmitted to said printer in turn to close the motor circuit to operate the motor, and the relay magnet for said second relay being energized when current flows through said motor circuit in turn to close said lamp switch.

8. In combination with a message transmitting circuit including the relay magnet of a controlling relay, a projector including a lamp, and a tape printer including a motor and a motor circuit operatively associated to be controlled by said controlling relay, a lamp circuit including said lamp and a switch, a second relay for operating the switch and included in said motor circuit, and means intermediate said second relay and the lamp switch and acting selectively by repetitious actions of the tape printer controlling relay to illuminate or extinguish the lamp while the printer is in active condition.

9. In combination with a message transmitting circuit including the relay magnet of a controlling relay, a projector including a lamp, and a tape printer including a motor and a motor circuit operatively associated to be controlled by said controlling relay, a lamp circuit including said lamp and a switch, a second relay for operating the switch and included in said motor circuit, and means intermediate said second relay and said switch for moving the switch to closed circuit position by one actuation of the second relay and to open circuit position on the next actuation of said second relay.

10. A communication system of the character described comprising a message transmitting circuit operatively associated to operate a controlling relay and a plurality of units, each unit comprising a printer including a motor and a motor circuit controlled by said controlling relay, a projector including a lamp, a lamp circuit including said lamp and a switch, a second relay for operating the switch and included in said motor circuit, and means intermediate said second relay and said switch and acting selectively by repetitious action of the tape printer controlling relay to illuminate or extinguish the lamp while the printer is in active condition.

11. In apparatus or a system of the class described, in combination with a message transmitting circuit including the relay magnet of a controlling relay, a tape printer including a motor and a motor circuit operatively associated with said relay magnet, and a projector including a lamp, an independent lamp circuit including a switch, and a second relay connected to operate the switch, the relay magnet for said latter relay being included in said motor circuit, whereby the lamp circuit is closed when the printer is put in operative condition, and broken when the printer is inoperative, the relay magnet of the controlling relay being energized when a message is transmitted to said printer in turn to close the motor circuit to operate the motor, and the relay magnet of said second relay being thereupon energized when current flows through said motor circuit in turn to close said switch.

12. A communication system of the character described comprising a message transmitting circuit including the relay magnet of a controlling relay, and a plurality of units, each unit comprising a printer including a motor and a motor circuit operatively associated with said controlling relay, and a projector including a lamp, an independent lamp circuit including a switch, and a second relay connected to operate the switch, the relay magnet for said second relay being included in said motor circuit, whereby the lamp circuit is closed when the printer is put in operative condition, and broken when the printer is inoperative, said controlling relay being actuated when a message is transmitted to said printer in turn to close the motor circuit to operate the motor, and the relay magnet of said second relay being energized when current flows through said motor circuit to close said switch.

13. A communication system of the character described comprising a message transmitting circuit operatively associated to operate a controlling relay, and a plurality of units, each unit comprising a printer including a motor and a motor circuit operatively associated with said controlling relay, and a projector including a lamp, an independent lamp circuit including a switch, a second relay connected to operate the switch, the relay magnet for said second relay being included in said motor circuit, whereby the lamp circuit is closed when the printer is put in operative condition, and broken when the printer is inoperative, and means intermediate the lamp circuit relay and the switch for moving the switch to closed circuit position by one actuation of the relay and to open circuit position on the next actuation of the relay, said controlling relay being actuated when a message is transmitted to said printer in turn to close the motor circuit to operate the motor, and the relay magnet for said second relay being energized when current flows through said motor circuit in turn to close said lamp switch.

14. In a telegraph system, a message transmitting circuit connecting a transmitting station having means for sending line impulses with a receiving station, tape printing mechanism at the receiving station for recording a message transmitted over said circuit, a projector including a lamp operatively associated with said tape printing mechanism, a lamp circuit including said lamp and a switch, a relay at said receiving station actuated from the transmitting station over said transmitting circuit and means intermediate said relay and the lamp switch and acting selectively by repetitious actions of said relay to close or open said switch, thereby selectively bringing the projector into and out of operation.

15. In a telegraph system, a message transmitting circuit connecting a transmitting station having means for sending line impulses with a receiving station, tape printing mechanism at the receiving station included in said transmitting circuit and including a circuit, a projector including a lamp operatively associated with said tape printing mechanism, a lamp circuit including said lamp and a switch, and selecting mechanism operatively connected to said switch and said printer circuit and adapted to be actuated from the transmitting station over said transmitting circuit to selectively open or close the switch in said lamp circuit.

16. In combination with a projector including a lamp, of a message transmitting circuit including the relay magnet of a controlling relay and a tape printer operatively associated with said relay magnet, a lamp circuit including said lamp and a switch, a second relay including a relay magnet for operating the switch associated with said lamp circuit, and operative connections between the message transmitting circuit and the relay magnet of said second relay, said first relay magnet being energized when said message transmitting circuit is affected in turn to effect the operation of said printer and the relay magnet of said second relay being energized when said printer is operated in turn to close said lamp switch.

17. In apparatus or a system of the class described, in combination with a message transmitting circuit including the relay magnet of a controlling relay, of a tape printer operatively associated with said relay magnet, a projector including a lamp, an independent lamp circuit including a switch and a second relay connected to the printer for operating the switch, said first relay magnet being energized when said message transmitting circuit is affected in turn to effect the operation of said printer, and the relay magnet of said second relay being energized when said printer is operated in turn to close said switch whereby the lamp circuit is closed when the printer is put in operative condition and broken when the printer is inoperative.

18. In combination with a projector including a lamp and a tape printer including a circuit and a controlling relay for said circuit, of a lamp circuit including said lamp and a switch, a relay for operating the switch and included in said printer circuit, and means operatively connected to the lamp circuit controlling relay and the lamp switch and acting selectively by repetitious actions of the tape printer controlling relay to illuminate or extinguish the lamp while the printer is in active condition.

19. In combination with a projector including a lamp, a message transmitting circuit, a tape printer included in said transmitting circuit and including a circuit, a controlling relay operatively connected to said transmitting circuit and said printer circuit, a lamp circuit including said lamp and a switch, a second relay for operating the switch and included in said printer circuit, and means operatively connected to the lamp circuit relay and the switch for moving the latter to closed circuit position by one actuation of the relay and to open circuit position on the next actuation of the relay.

20. The combination of a projector including a lamp, a message-transmitting circuit including the relay magnet of a relay and a tape printer operatively associated with said relay magnet, a lamp circuit including said lamp, a switch, and a second relay including a relay magnet for operating the switch associated with said lamp circuit, said first relay being energized by electric impulses originating in the message-transmitting circuit in turn to effect the operation of said printer and the relay magnet of said second relay being operatively associated with said first relay to be energized when said first relay is energized in turn to close said lamp switch whereby the on or off condition of the lamp is the direct automatic sequence of a condition remotely impressed on the message-transmitting circuit.

21. The combination of a projector including a lamp, a message-transmitting circuit for remotely controlling the on and off position of the lamp, a recorder system operatively associated in said circuit, a lamp circuit including said lamp and a switch, a switch-controlling device operatively associated with said recorder system and with the lamp switch, said device being responsive to an operation originating in said message-transmitting circuit and in accordance therewith actuating said switch to establish an on or an off condition of said lamp.

22. The combination with a motor-driven ticker, of wiring for connecting the motor of said ticker to a source of current and responsive to establish an electric circuit through said motor when a message is transmitted to said ticker, a lamp, wiring connecting said lamp to a source of current, and means including a switch controlled by the currrent passing through the wiring of said motor to control the current passing through the wiring of said lamp.

23. The combination with a motor-driven ticker, of wiring for connecting the motor of said ticker to a source of current and responsive to establish an electric circuit through said motor when a message is transmitted to said ticker, a lamp, wiring connecting said lamp to said source of current, and means including a switch controlled by the current passing through the wiring of said motor to control the current passing through the wiring of said lamp.

24. The combination with a ticker, of wiring for including said ticker in an electric circuit and responsive to establish an electric circuit when a message is transmitted to said ticker, a lamp, wiring for including said lamp in an electric circuit, and means including a switch controlled by the current passing through the wiring of said ticker to control the current passing through the wiring of said lamp.

AUGUST D. EITZEN.